(12) United States Patent
Carnick et al.

(10) Patent No.: US 11,640,881 B2
(45) Date of Patent: May 2, 2023

(54) JUNCTION BOX ASSEMBLY HAVING A SWITCH ASSEMBLY

(71) Applicant: Sumitomo Wiring Systems, Ltd., Yokkaichi (JP)

(72) Inventors: Brian Carnick, Farmington Hills, MI (US); Christopher Alexander, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 237 days.

(21) Appl. No.: 17/097,444

(22) Filed: Nov. 13, 2020

(65) Prior Publication Data

US 2022/0157537 A1 May 19, 2022

(51) Int. Cl.
*B60R 16/03* (2006.01)
*H01H 9/02* (2006.01)
*H01H 9/52* (2006.01)
*H02B 1/48* (2006.01)

(52) U.S. Cl.
CPC ............. *H01H 9/02* (2013.01); *B60R 16/03* (2013.01); *H01H 9/52* (2013.01); *H02B 1/48* (2013.01); *H01H 2009/0278* (2013.01)

(58) Field of Classification Search
USPC ........................................................ 174/535
See application file for complete search history.

(56) References Cited

U.S. PATENT DOCUMENTS 10,148,074 B1 * 12/2018 Matsumura .......... H05K 5/0221
2019/0394904 A1 * 12/2019 Lee ...................... H05K 1/0209

* cited by examiner

*Primary Examiner* — Rexford N Barnie
*Assistant Examiner* — Xuan Ly
(74) *Attorney, Agent, or Firm* — Honigman LLP (57) ABSTRACT

A switch assembly is configured to be mounted to a lower cover of the junction box assembly. The switch assembly includes a holder, the holder is configured to removably coupled to the lower cover. The holder includes a pocket. The switch assembly further includes a switch. The hook is configured to engage the lower cover and is dimensioned to be seated within the pocket of the holder. The switch includes a hook. The hook is configured to pull the switch towards the lower cover so as to pinch the holder between the lower cover and the switch. Accordingly, the hook presses the switch against a bottom surface of the lower cover so as to eliminate a rattle when the switch is held in suspension beneath the lower cover of the junction box assembly.

17 Claims, 11 Drawing Sheets

JUNCTION BOX ASSEMBLY HAVING A SWITCH ASSEMBLY

TECHNICAL FIELD

The disclosure relates to a junction box assembly. In particular the disclosure relates to a junction assembly configured to hold a switch assembly in suspension.

BACKGROUND

Junction box assemblies are known for use in automotive vehicles. Junction box assemblies are configured to facilitate the distribution of power throughout various electric devices of the vehicle. With the increasing electrification and automation of automotive vehicles comes in increase in the number of the number of electric devices. Accordingly, the number of electrical switches required to control the electrical devices have also increased. However, packaging constraints may not allow for the inclusion of the switches within the power distribution box. Additionally, the junction box assembly may be used for multiple vehicular platforms and thus a need for a particular electric device in one platform may not be necessary for another platform. Thus, some vehicles may require an additional switch while others may not.

It is known that the packaging constraints within the vehicle may be limited and in some cases the space available to mount a switch assembly is disposed on a bottom surface of the junction box assembly. However, in such a case, the power distribution box may rattle against the switch assembly.

Accordingly, it is desirable to have a junction box assembly configured to hold a switch assembly. It further remains desirable to have a switch assembly which is configured to attach to the junction box in suspension and eliminate a rattle.

SUMMARY

In one aspect a switch assembly is provided, the switch assembly is configured to be mounted to a lower cover of a junction box assembly. The switch assembly includes a holder. The holder is configured to be removably coupled to the lower cover. The holder includes a pocket. The switch assembly further includes a switch. The switch includes a hook. The hook is configured to engage the lower cover. The switch is dimensioned to be seated within the pocket of the holder wherein the hook is further configured to pull the switch towards the lower cover so as to pinch the holder between the lower cover and the switch.

In one aspect the hook includes a ramp shape portion and a finger portion. The finger portion is spaced apart from a bottom surface of the switch.

In another aspect the switch assembly includes a first fastener for securing the switch to the holder.

In another aspect the switch is a generally cubital member and the hook is disposed on a bottom surface of the switch.

In another aspect the pocket of the holder is defined by a pair of first side-walls, a first back-wall, a first top wall and an open front.

In another aspect the switch includes a pair of second side-walls, a second first-wall, a second back-wall and a second bottom-wall, wherein the pair of second side-walls are longer than the first side-walls of the holder.

In another aspect the hook is disposed on a front portion of the second bottom-wall, so as to be spaced apart from an open front of the pocket of the holder.

In another aspect the switch includes a plurality of heat dissipation fins. The heat dissipation fins are disposed on a top surface of the switch.

In another aspect the holder includes a plurality elongated swats. The elongated swats are configured to receive a corresponding one of the heat dissipation fins.

Also disclosed herein is a junction box assembly. The junction box assembly is configured to distribute power to various electric components. The junction box assembly includes a lower cover. The lower cover has a floor. A floor has an inner surface and an outer surface. The outer surface is opposite of the inner surface. A peripheral wall is disposed on the inner surface of the floor and bounds a peripheral edge of the floor. The junction box assembly further includes a holder. The holder is configured to removably coupled to the outer surface of the floor of the lower cover. The holder includes a pocket. A switch having a hook is configured to be seated within the pocket of the holder. The hook is configured to engage the lower cover and the hook is dimensioned to pull the switch towards the lower cover so as to pinch the holder between the lower cover and the switch.

In one aspect the hook includes a ramp-shaped portion and a finger portion. The finger portion is spaced apart from a bottom surface of the switch.

In one aspect the junction box assembly further includes a first fastener for securing the switch to the holder.

In another aspect the switch is a generally cubital member and the hook is disposed on a bottom surface of the switch.

In another aspect the pocket of the holder is defined by a pair of first side-walls, a first back-wall, a first top haul and an open front.

In another aspect the switch includes a pair of second side-walls, a second first-wall, a second back-wall and a second bottom-wall. The pair of second side-walls are spaced apart from each other and are longer than the first side-walls of the holder.

In another aspect the hook is disposed on a front portion of the second bottom-wall, so as to be spaced apart from an open front of the pocket of the holder.

In another aspect the junction box assembly includes a plurality of heat dissipation fins disposed on the top surface of the switch.

In another aspect the holder includes a plurality elongated swats. The elongated swats are configured to receive a respective one of the heat dissipation fins.

In another aspect the lower cover includes a pair of receiving walls. The receiving walls are spaced apart from each other and disposed on the outer surface of the lower cover. The pair of receiving walls are configured to engage the holder.

In another aspect the pair of receiving walls include an engagement feature configured to be releasably engaged with the pair of second side-walls of the switch.

DETAILED DESCRIPTION OF PREFERRED EMBODIMENTS

A switch assembly and a junction box assembly configured to hold a switch assembly in suspension is provided. A switch assembly is configured to be mounted to a lower cover of the junction box assembly. The switch assembly includes a holder, the holder is configured to removably coupled to the lower cover. The holder includes a pocket. The switch assembly further includes a switch. The hook is configured to engage the lower cover and is dimensioned to be seated within the pocket of the holder. The switch includes a hook. The hook is configured to pull the switch towards the lower cover so as to pinch the holder between the lower cover and the switch. Accordingly, the hook presses the switch against a bottom surface of the lower cover so as to eliminate a rattle when the switch is held in suspension beneath the lower cover of the junction box assembly.

Figure 1:
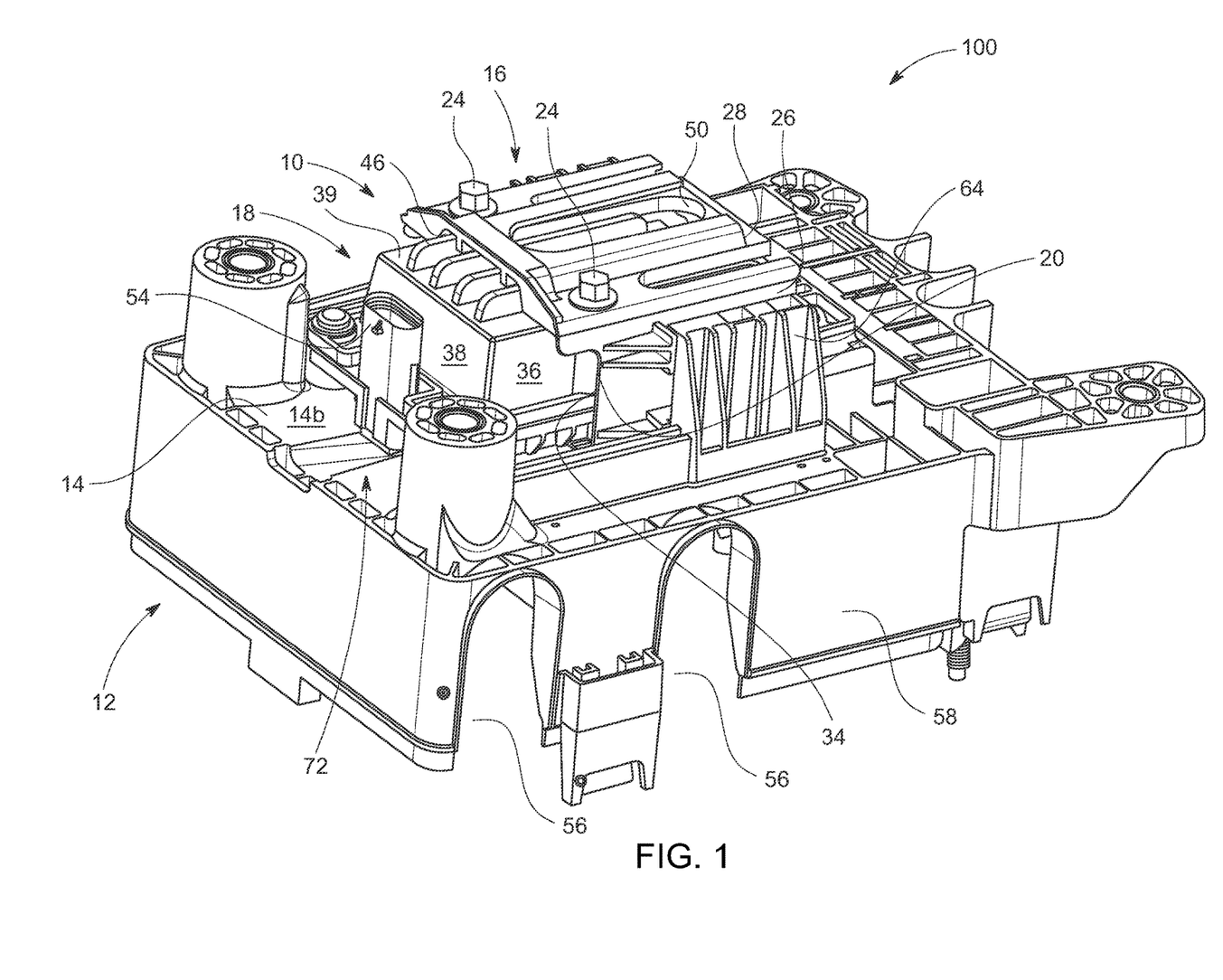
FIG. 1 is a perspective view of a junction box assembly according to one aspect illustrated herein.

With reference now to FIG. 1, a switch assembly 10 is provided. The switch assembly 10 is configured to attach to a lower cover 12 of a junction box assembly 100 so as to be suspended from a floor 14 of the lower cover 12. FIG. 1 depicts the switch assembly 10 resting on the floor 14. However, it should be appreciated that when mounted to a vehicle that the switch assembly 10 is inverted, that is, the switch assembly 10 hangs from the floor 14 of the lower cover 12.

Figure 2:
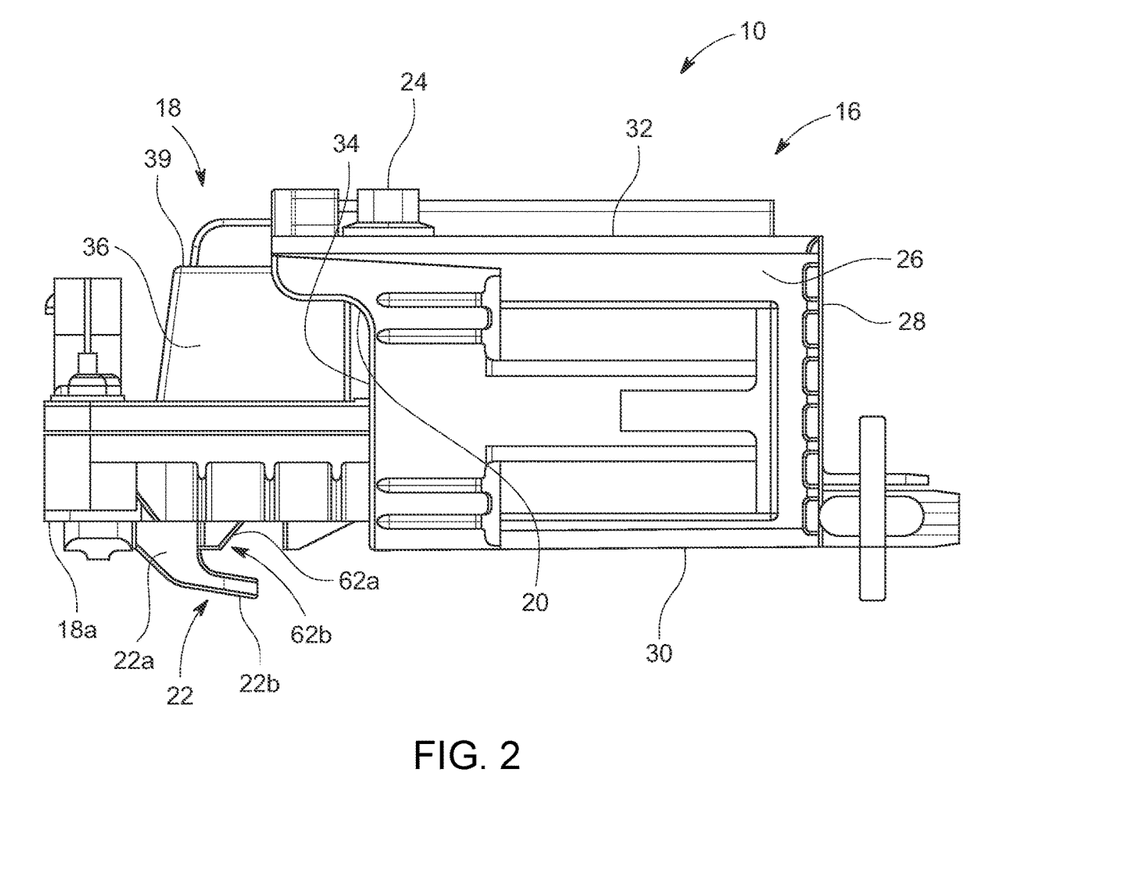
FIG. 2 is a side-view of a switch assembly according to one aspect illustrated herein.
Figure 3:
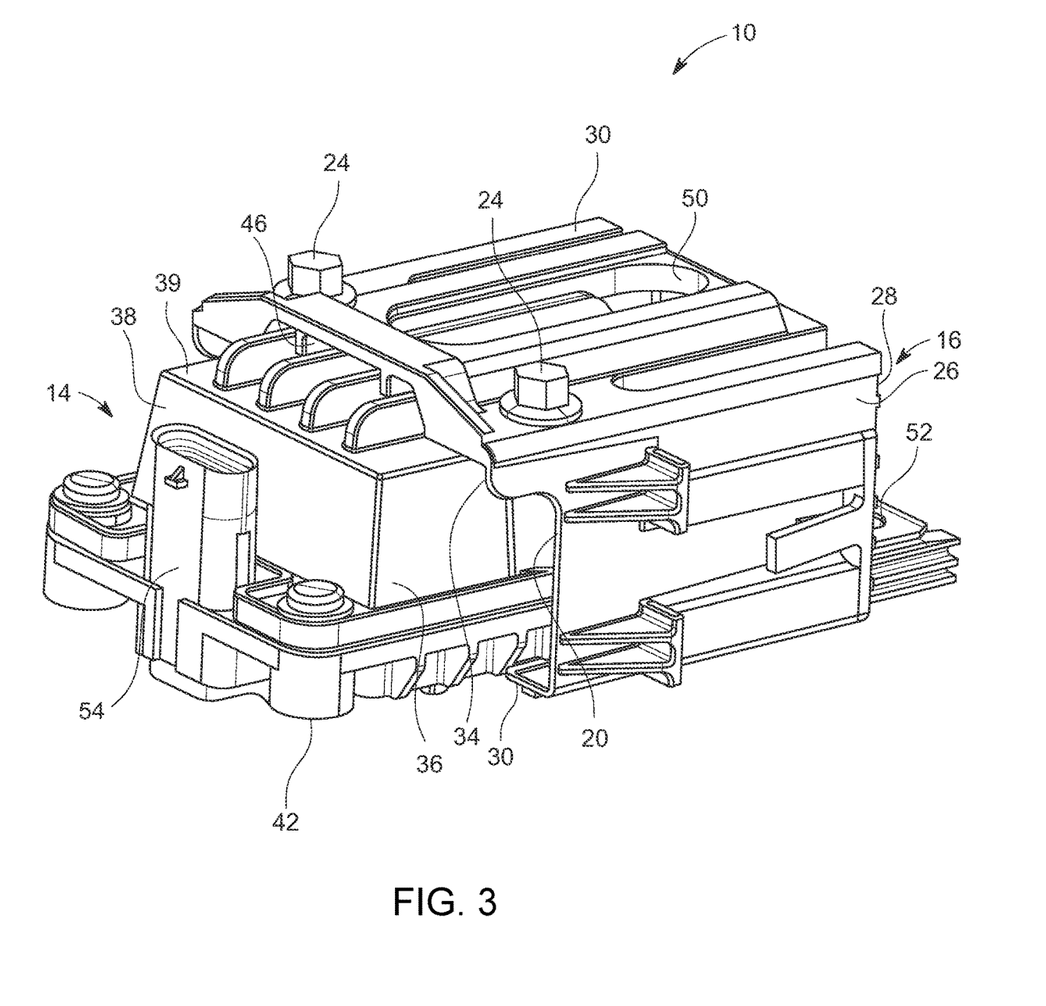
FIG. 3 is a front perspective view of the switch assembly shown in FIG. 2.
Figure 4:
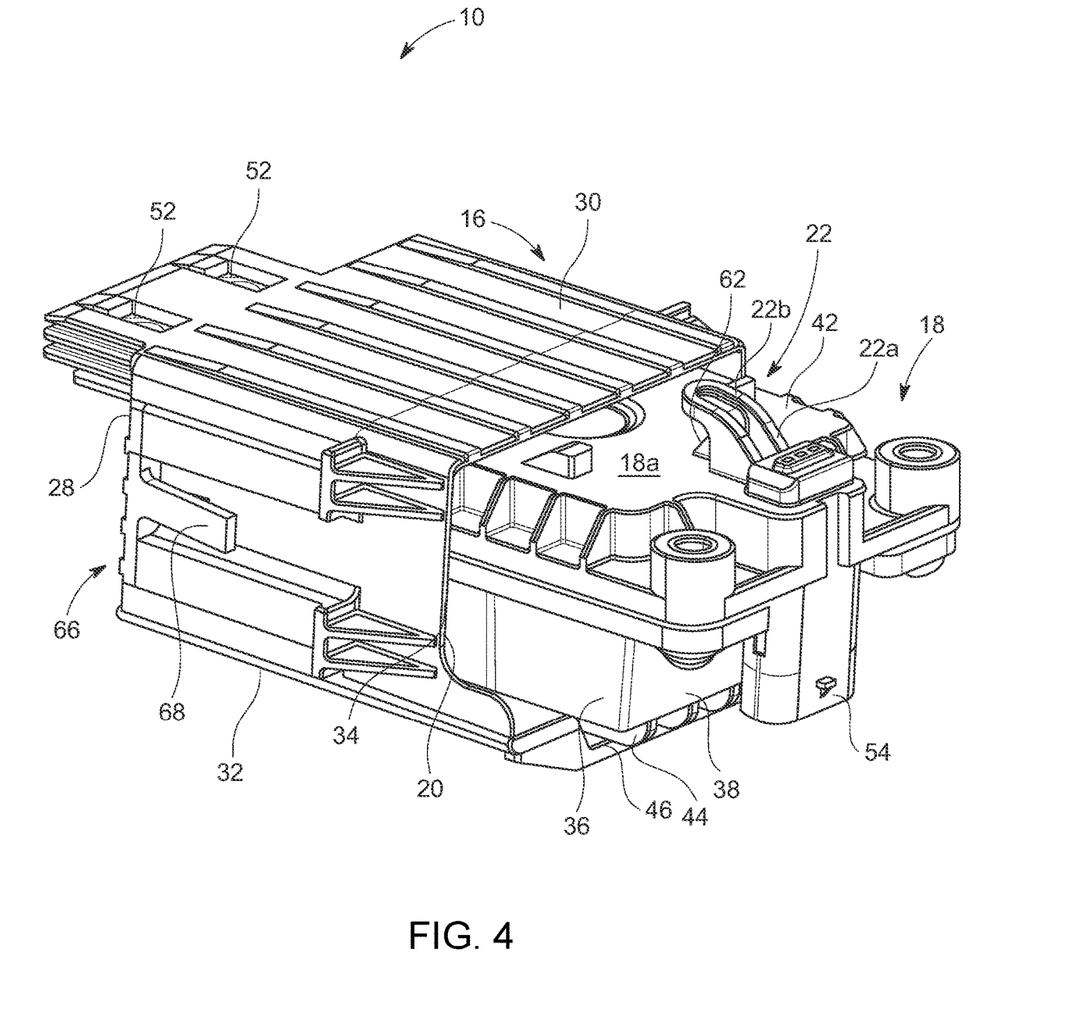
FIG. 4 is a perspective view of showing the bottom surface of the switch assembly shown in FIG. 2.

With reference now to FIGS. 2-4, an isolated view of the switch assembly 10 taken from the side is provided. The switch assembly 10 includes a holder 16 and a switch box 18. The switch box 18 is removably mounted to the holder 16.

The holder 16 is configured to be removably coupled to the lower cover 12. The holder 16 includes a pocket 20. The switch box 18 is mounted within the pocket 20. The switch box 18 includes a hook 22. The hook 22 is engaged the lower cover 12. The hook 22 is further configured to pull the switch box 18 towards the lower cover 12 so as to pinch the holder 16 between the switch box 18 and the lower cover 12.

The switch box 18 may include a first fastener 24 for securing the switch box 18 to the holder 16 for illustratively purposes, the first fastener 24 is shown as a bolt. However, is should be appreciated that any fastening mechanisms currently known or later developed may be adopted for use herein.

The switch box 18 is a generally cubital member and the hook 22 is disposed on a bottom surface 18a of the switch box 18. The switch box 18 is configured to house various electronic components for routing signals and power to various electric devices within the vehicle (not shown). In one aspect, the switch box 18 is formed of a metal so as to tolerate a high temperature environment generated by the operation of a switch box 18. The holder 16 may be formed of a similar material or may be made of a material suitable for an injunction molding process illustratively including polypropylene, Acrylonitrile butadiene styrene, polyoxymethylene, polycarbonate and the like.

The pocket 20 of the holder 16 is defined by a pair of first side walls 26, a first back wall 28, a first bottom wall 30, and a first top wall 32 so as to define an open front 34. The first side walls 26 are spaced apart from each other and are closed at one end by the first back wall 28, at the bottom by the first bottom wall 30 and at the top by the first top wall 32. The first bottom wall 30 is a generally planar member. The first bottom wall 30 may include ribs disposed on the outer surface of the first bottom wall 30, as shown in FIG. 4. However, it should be appreciated that the first bottom wall 30 may be smooth.

The switch box 18 includes a pair of second side walls 36, a second front wall 38, a second back wall 40 and a second bottom wall 42. The second side walls 36 are longer than the first side walls 26 of the holder 16. This allows for an assembly worker or service provider to install or remove the switch box 18 from the holder 16. This may be done by simply removing the first fasteners 24 and griping the exposed portion of the switch box 18 and sliding the switch box 18 into or out of the holder 16, as the case may be.

With reference now to FIG. 4, the hook 22 is shown disposed on a front portion of the second bottom wall 42 of the switch box 18. The hook 22 is spaced apart from the open front 34 of the pocket 20 of the holder 16. The hook 22 extends towards a center of the second bottom wall 42 of the switch box 18.

The switch box 18 may include a plurality of heat dissipation fins 44. The heat dissipation fins 44 are disposed on a top surface of the second top wall 39 of the switch box 18. For illustratively purposes the switch box 18 is shown as having four heat dissipation fins 44. However, is should be appreciated that a number of heat dissipation fins 44 may differ without deviating from the scope of the appended claims. The holder 16 includes a pair of elongated slots 46. The elongated slots 46 are defined by a dividing wall 48 which extends along the axial length of the first top wall 32 of the holder 16. In particular, the dividing walls 48 are formed on an inner surface of the first top wall 32 and are configured to receive the heat dissipation fins 44. The first top wall 32 may include openings 50 for facilitating heat dissipation.

The back of the switch box 18 includes an input terminal 52 for receiving a power supply to power to the switch box 18. For illustrative purposes the switch box 18 is shown as having a pair of input terminals 52. The switch box 18 further includes an output terminal 54 is configured to transmit a signal and/or power from the switch box 18 to an electric device. For illustrative purposes, the input terminals 52 and the output terminal 54 are shown disposed on opposite sides of the switch box 18; however, it should be appreciated that the input terminals 52 and the output terminal 54 may be co-located on the same side of the switch box 18.

Figure 5:
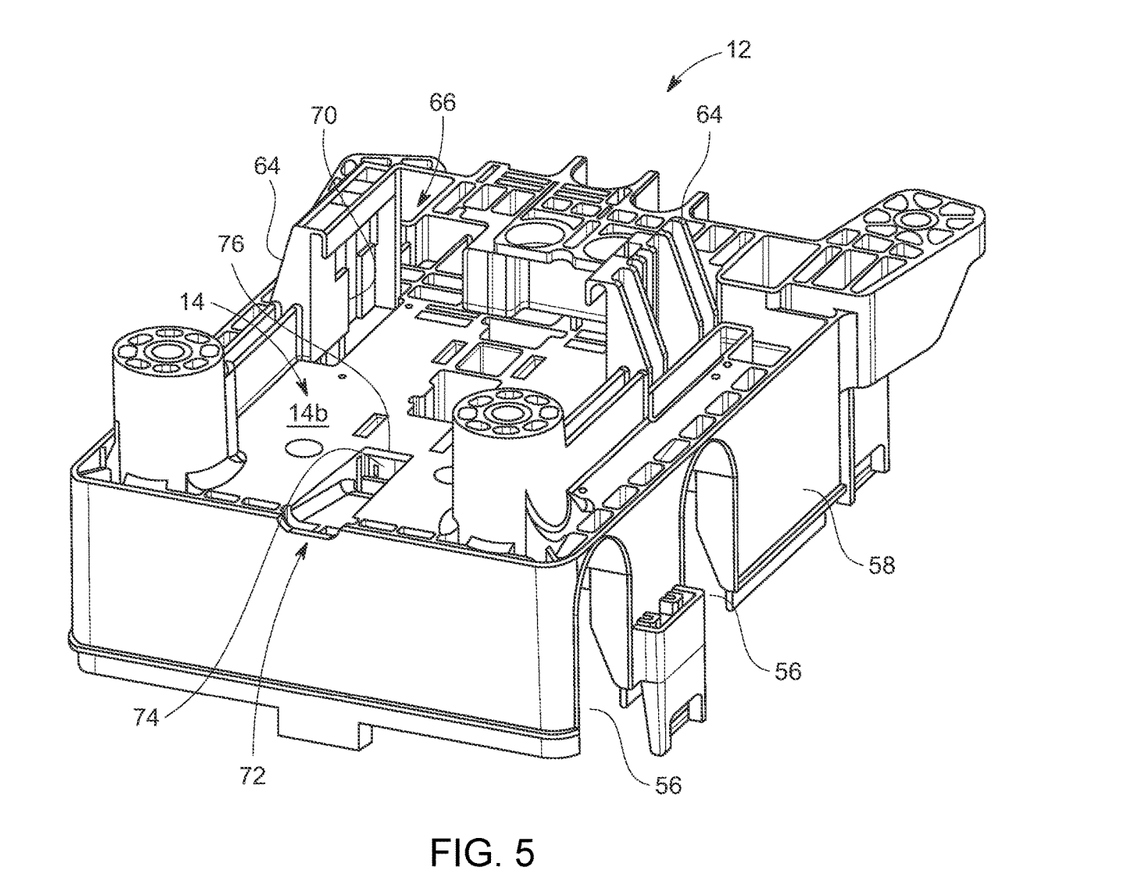
FIG. 5 is a perspective view of the outer surface of a lower cover.

With reference again to FIG. 1 and now to FIG. 5 a junction box assembly 100 is provided. The junction box assembly 100 is configured to distribute power to various electric devices (not shown). Preferably, the junction box assembly 100 may be used in an automotive vehicles to distribute power from a battery to electrical devices such as windshield wipers, power side-mirrors, headlamps and the like.

The junction box assembly 100 includes a lower cover 12. The lower cover 12 is configured to house various electronic components for distributing power such as a connector housing, connector assembly, switches, fuses, relays and the like. The junction box assembly 100 includes an upper cover, upper housing, lower housing and a lower cover 12. For illustrative purposes, the upper cover, upper housing and lower housing are omitted. The orientation of the junction box assembly 100 shown in FIGS. 1 and 5 is inverted relative to its intended use. That is when the junction box assembly 100 is mounted to the vehicle, the lower cover 12 would be turned 180 degrees relative to the orientation shown in FIGS. 1 and 5, making the lower cover 12 upright.

The lower cover 12 includes a pair of wire routing openings 56 for routing a wire bundle (not shown) from the connector assembly (not shown) to a various electronic devices. The lower cover 12 includes a floor 14 having an inner surface 14a and an outer surface 14b. The outer surface 14b is opposite the inner surface 14a. A peripheral wall 58 is disposed on the inner surface 14a of the floor 14 and bounds the peripheral edge of the floor 14.

The wire routing openings 56 are formed on a side of the peripheral wall 58. Electric components, such as the connector assembly, are housed in the space bound by the peripheral wall 58 and the inner surface of the floor. Thus, when the lower cover 12 is turned relative to the orientation shown in FIGS. 1 and 5, the electric components are supported by the floor 14.

A holder 16 is removably coupled to the outer surface 14b of the floor 14 of the lower cover 12. The holder 16 includes a pocket 20 and a switch box 18. The switch box 18 is dimensioned to be seated within the pocket 20 of the holder 16.

The switch box 18 includes a hook 22 shown in FIGS. 2, 9, 10 and 11. The hook 22 is configured to engage the lower cover 12 so as to pull the switch box 18 towards the lower cover 12 pinching a portion of the holder 16 between the lower cover 12 and the switch box 18 so as to reduce any rattling. In particular, the first bottom wall 30 of the holder 16 is pressed against the outer surface 14b of the floor 14.

In one aspect, the hook 22 includes a ramp-shaped portion 22a and a finger portion 22b. The ramp-shaped portion 22a is disposed on the second bottom wall 42 of the switch box 18. The finger portion 22b is formed on a distal end of the ramp-shaped portion 22a. The finger portion 22b is spaced apart from a bottom surface of the switch box 18 so as to define a gap 60. A locking tab 62 is disposed on the bottom surface of the switch box 18. The locking tab 62 is a fin shaped member having an angled edge 62a and a planar top 62b (see FIGS. 2, 4, 10 and 11). The planar top 62b and the angled edge 62a are spaced apart from an undersurface of the finger portion 22b so as to give the gap 60 a generally wedge-shaped cross section. The locking tab 62 is configured to guide the holder 16 into a locking engagement with the lower cover 12.

A first fastener 24 is configured to secure that a switch box 18 to the holder 16. The switch box 18 is a generally cuboidal member and the hook 22 is disposed on a bottom surface 18a of the switch box 18. The pocket 20 of the holder 16 is defined by a pair of first side walls 26, a first back wall 28, a first bottom wall 30, and a first top wall 32 so as to define an open front 34. The first side walls 26 are spaced apart from each other and are closed at one end by the first back wall 28, at the bottom by the first bottom wall 30 and at the top by the first top wall 32. The first bottom wall 30 is a generally planar member.

The switch box 18 includes a pair of second side walls 36, a second front wall 38, a second back wall 40 and a second bottom wall 42. The second side walls 36 are longer than the first side walls 26 of the holder 16. This allows for an assembly worker or service provider to install or remove the switch box 18 from the holder 16. This may be done by simply removing the first fasteners 24 and griping the exposed portion of the switch box 18 and sliding the switch box 18 into or out of the holder 16, as the case may be.

The hook 22 is disposed on a front portion of the second bottom wall 42 and is spaced apart from the open front 34 of the pocket 20 of the holder 16. A plurality of heat dissipation fins 44 are disposed on a top surface of the switch box 18. The holder 16 includes a plurality elongated slots 46. The elongated slots 46 are configured to receive the plurality of heat dissipation fins 44.

Figure 6:
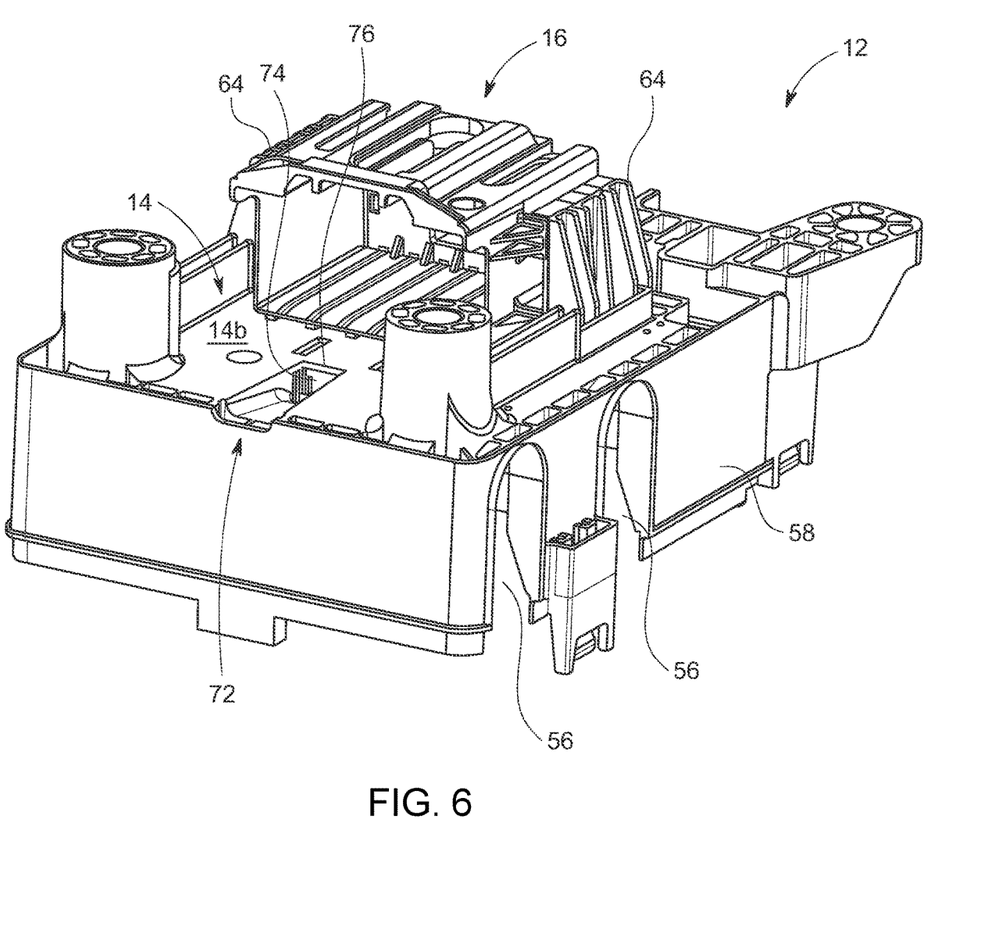
FIG. 6 is a perspective view of the lower cover shown in FIG. 5 with the holder.

As shown in FIGS. 6 and 5, the lower cover 12 may include a pair to receiving walls 64. The receiving walls 64 are disposed on the outer surface 14b of the floor 14 of the lower cover 12. The receiving walls 64 are spaced apart from each other and are configured to engage the holder 16. In one aspect, the junction box assembly 100 includes an engagement feature 66. The engagement feature 66 is configured to releasably engage the holder 16 to the lower cover 12. In one aspect of an engagement feature 66, the second sidewalls 36 of the switch box 18 include a resilient tab 68 and the inner surface of the receiving walls 64 include a catch 70. The tabs 68 extend outwardly from the second side walls 36 of the switch box 18. The tabs 68 are configured to engage the catch 70 disposed along the inner surface of the respective receiving walls 64. It should be appreciated that any mechanical engagement feature currently known or known or used or later developed may be modified and adopted for use herein.

With reference again to FIG. 5, an operation of the junction box assembly 100 is provided. The junction box assembly 100 is installed such that the outer surface 14b of the lower cover 12 is hidden. That is, the orientation of the lower cover 12 shown in FIG. 5 is rotated 180 degrees placing the receiving walls 64 in a downward projection. The lower cover 12 may be attached to a vehicle structure using common fastening devices such as bolts.

Figure 7:
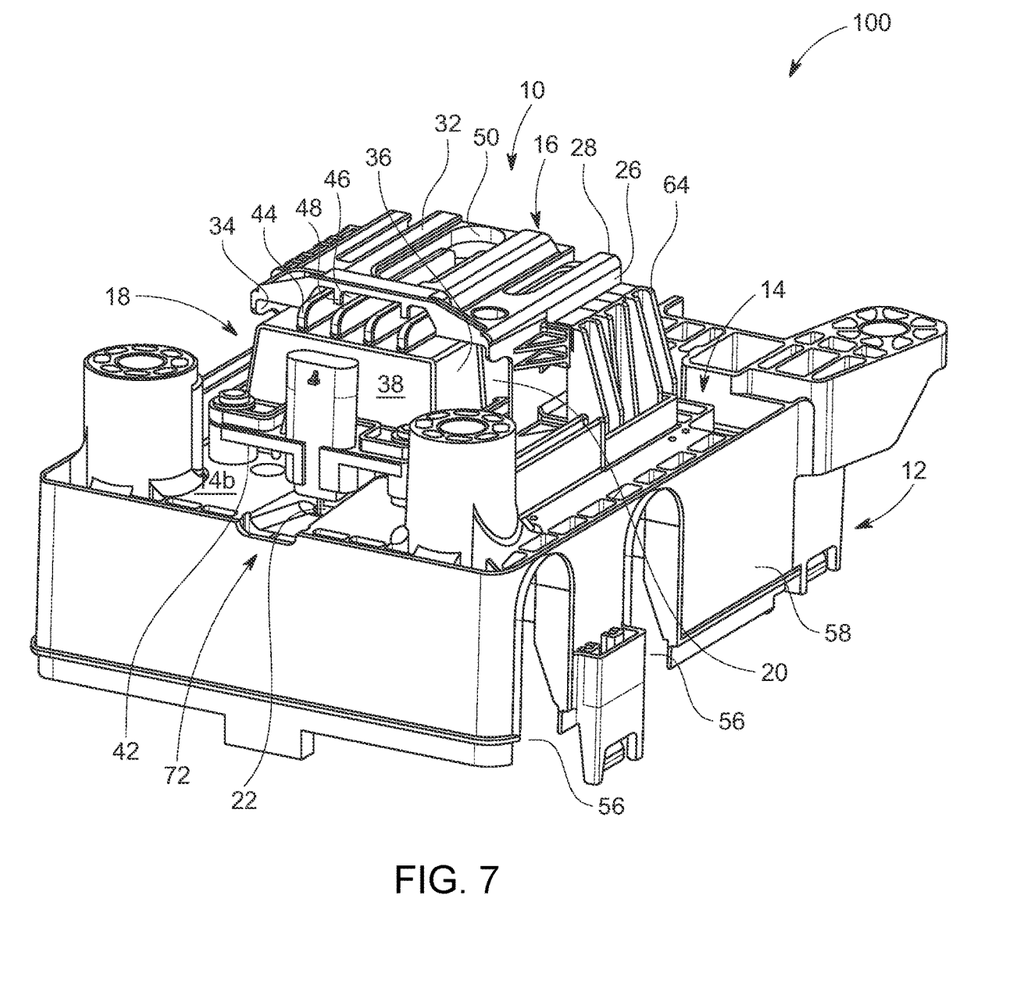
FIG. 7 is perspective view of FIG. 6 showing the switch mounted within the holder.
Figure 8:
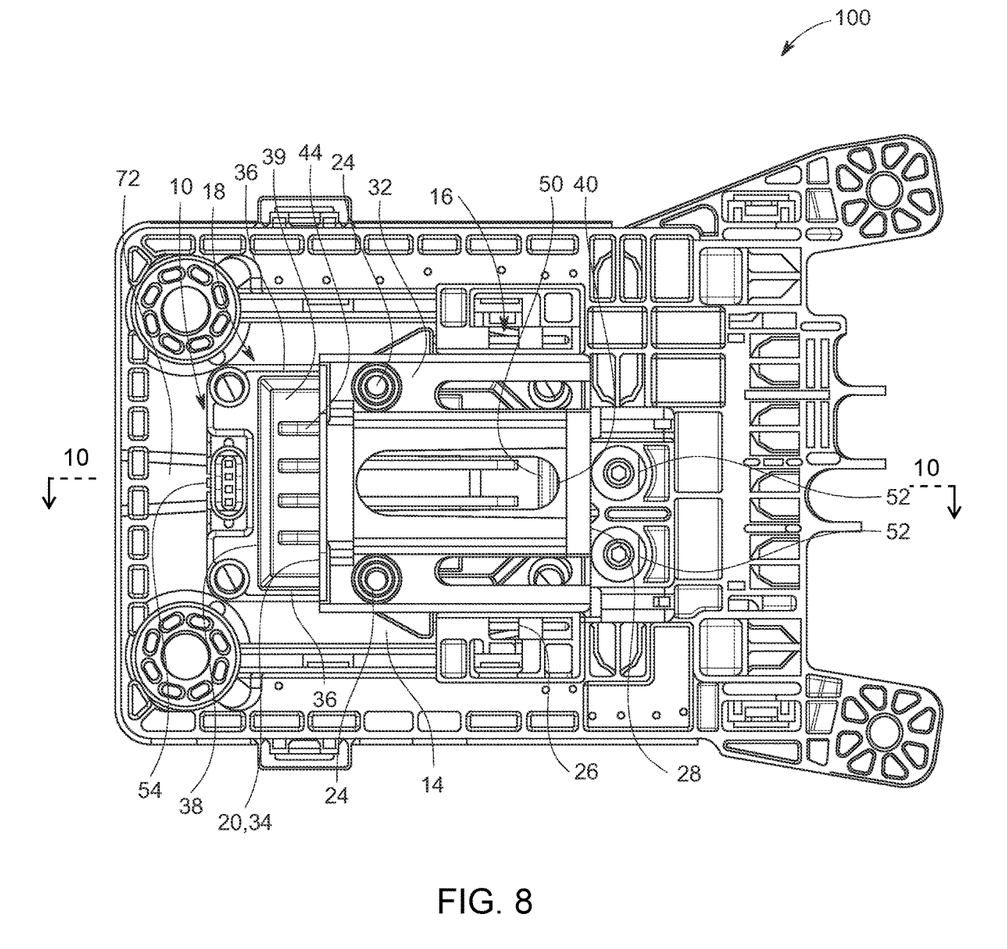
FIG. 8 is bottom view of the junction box assembly shown in FIG. 7.

With reference now to FIG. 6, the assembler simply slides the holder 16 in between the pair of receiving walls 64 wherein the respective tabs 68 engage the catches 70 disposed on the inner surface of the receiving walls 64 snapping the holder 16 into the receiving walls 64. Preferably, the switch box 18 is seated into the holder 16 first, as shown in FIGS. 3 and 4 so as to form the switch assembly 10. As shown, the switch box 18 may be fixed to the holder 16 by the installation of the first fasteners 24. In this example, a pair of first fasteners 24 are simply screwed into corresponding holes of the holder 16. The holes align with a threaded bore of the switch box 18. In such a manner, the switch box 18 is secured to the holder 16 so as to form the switch assembly 10. The switch assembly 10 is then simply inserted into the receiving walls 64 of the holder 16 as shown in FIGS. 7.

Figure 9:
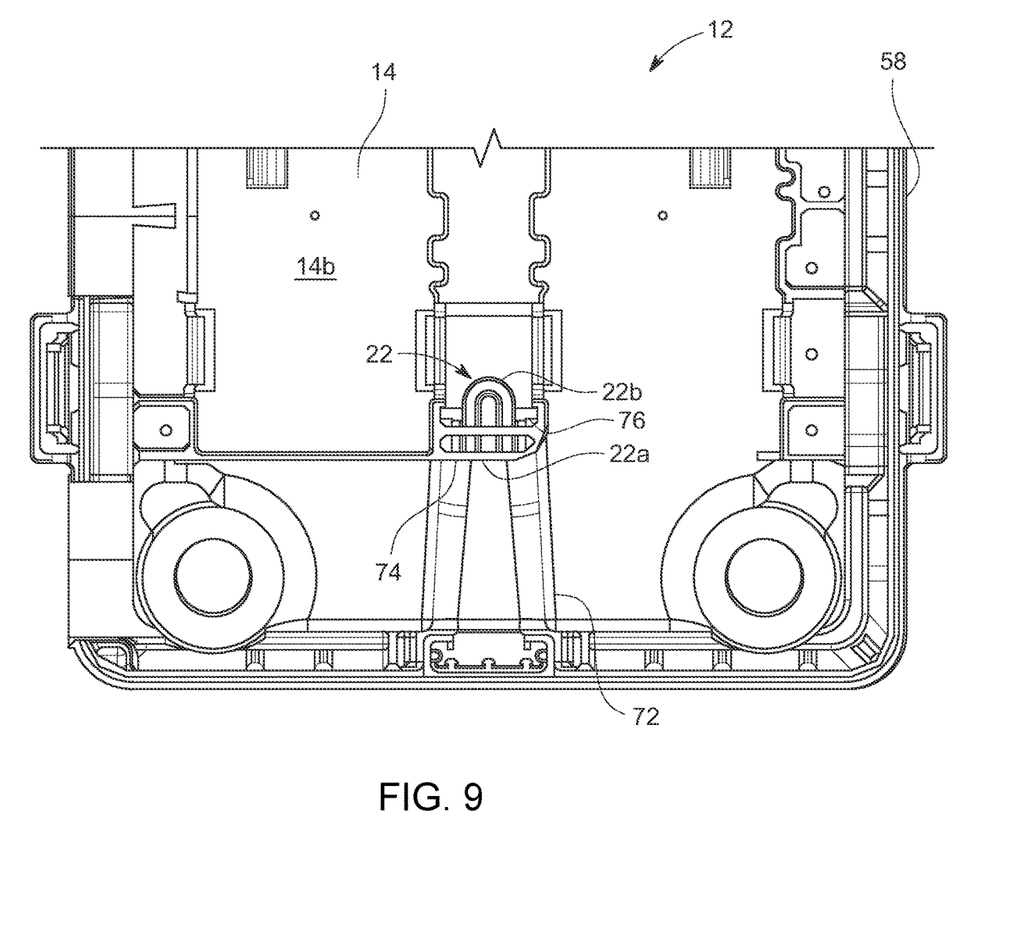
FIG. 9 is a top down view of the junction box assembly shown in FIG. 8.
Figure 10:
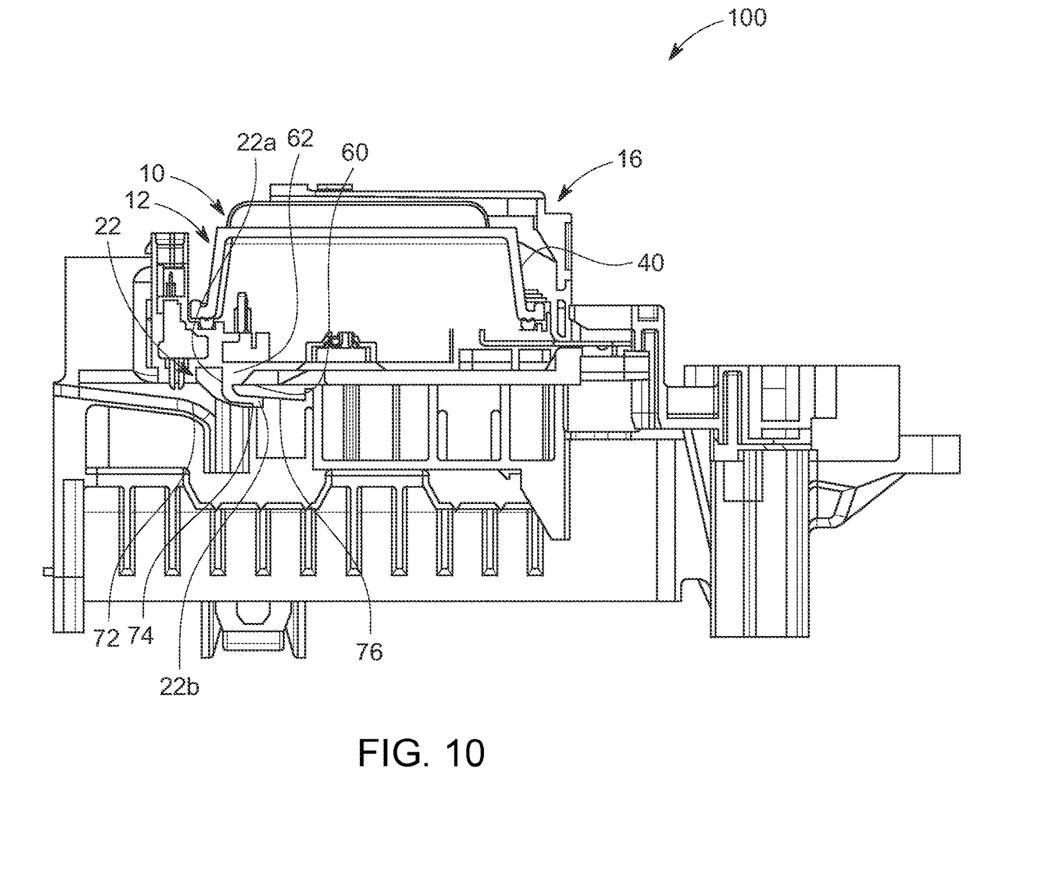
FIG. 10 is cross-section view of the junction box assembly shown in FIG. 8 taken along lines 10-10.
Figure 11:
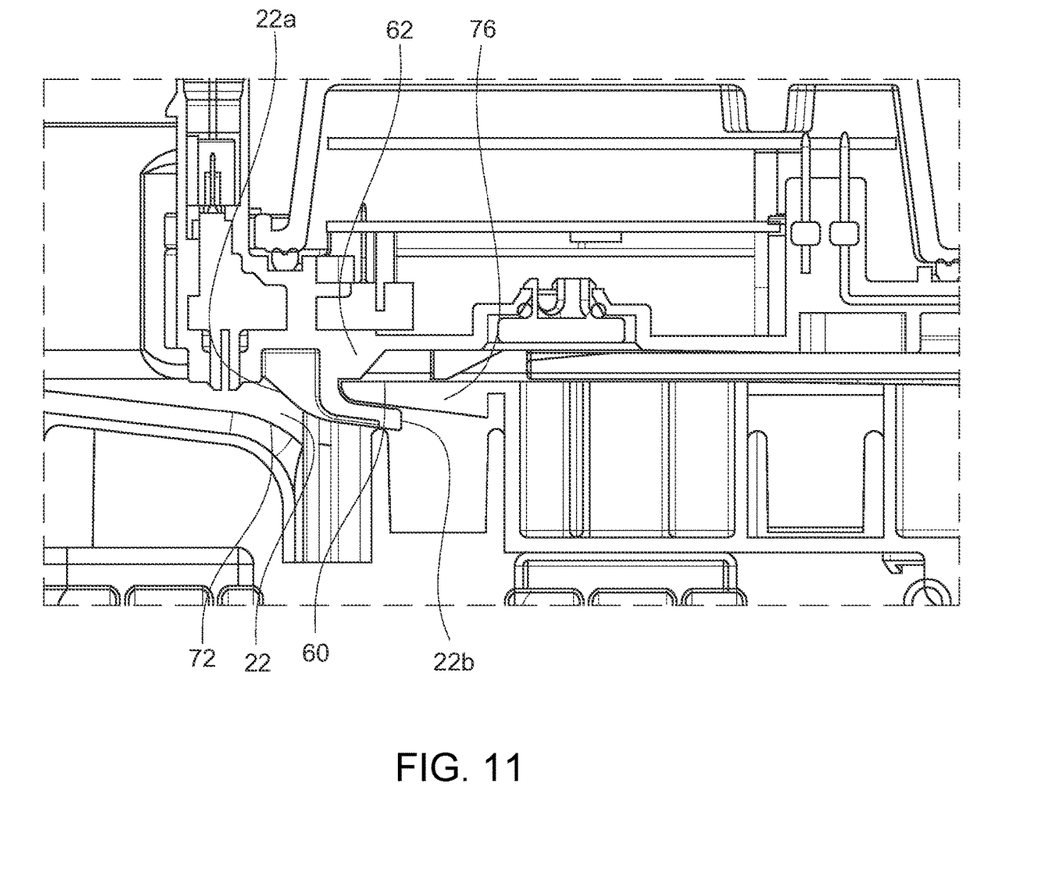
FIG. 11 is a close-up view of FIG. 10 showing the hook engaged with the lower cover.

With reference now to FIGS. 9-11, the lower cover 12 includes a slot 72 having ramp-shaped surface. The slot 72 has a width that is wider than the width of the hook 22 and is angled. The slot 72 leads into a slot opening 74 which is open to the inner space of the lower cover 12. The slot 72 guides the hook 22 so as to properly position the hook 22 into engagement with a lip 76 of the lower cover 12.

In particular, the ramp-shaped portion 22a of the hook 22 is slid along the slot 72 until the finger portion 22b of the hook 22 is seated into the slot opening 74. Concurrently, the lip 76 of the lower cover 12 is pinched between the finger portion 22b and the locking tab 62. FIGS. 10 and 11 show that the engagement is a pinched fit engagement and the first bottom wall 30 of the holder 16 is pinched between the lower cover 12 and the second bottom wall 42 of the switch box 18.

Accordingly, when the switch assembly 10 is held in suspension, the hook 22 retains a tight engagement between the switch box 18 and the holder 16 and lower cover 12 so as to prevent rattling. It should be appreciated that, the receiving walls 64 of the lower cover 12 are designed to provide a clearance along a direction of the height of the lower cover 12 due to manufacturing tolerances. Such a tolerance provides a gap (along the height of the receiving walls 64) which may generate a rattling noise and thus the hook 22 eliminates the gap by pressing the switch box 18 against the lower cover 12 and holding the holder 16 there between.

It should be further appreciated that the hook 22 provides the assembly worker or service provider with the ability to simply attach or remove the switch assembly 10 from the lower cover 12. Thus, the same junction assembly box 100 may be used across multiple vehicle platforms.

While particular embodiments have been illustrated and described herein, it should be appreciated that various other changes and modifications may be made without departing from the spirit and scope of the claimed subject matter. Moreover, although various aspects of the claimed subject matter have been described herein, such aspects need not be realized in combination. It is therefore intended that the appended claims cover all such changes and modifications that are within the scope of the claimed subject matter.

We claim:

1. A switch assembly configured to be mounted to a lower cover of a junction box, the switch assembly comprising:
   a holder configured to be removably coupled to the lower cover, wherein the holder includes a pair of first side walls, a first back wall, and a first top wall connected to each other to define a pocket having an open front; and
   a switch, the switch including a hook including a ramp shaped portion and a finger portion, the finger portion spaced apart from a bottom surface of the switch to define a gap configured to accommodate a thickness of the first bottom wall of the holder, the hook configured to engage the lower cover, the switch being dimensioned to be seated within the pocket of the holder, wherein the hook is further configured to pull the switch towards the lower cover so as to pinch the switch against the lower cover.

2. The switch assembly as set forth in claim 1, further including a first fastener for securing the switch to the holder.

3. The switch assembly as set forth in claim 1, wherein the switch is a generally cuboidal member, the hook disposed on a bottom surface of the switch.

4. The switch assembly as set forth in claim 1, wherein the switch includes a pair of second side walls, a second front wall, a second back wall and a second bottom wall, the pair of second side walls being longer than the pair of first side walls of the holder.

5. The switch assembly as set forth in claim 4, wherein the hook is disposed on a front portion of the second bottom wall so as to be spaced apart from the open front of the pocket of the holder.

6. The switch assembly as set forth in claim 1, further including a plurality of heat dissipation fins disposed on a top surface of the switch.

7. The switch assembly as set forth in claim 6, wherein the holder includes a plurality of dividing walls disposed on an inner surface of the first top wall, the plurality of dividing walls spaced apart from each other to define a plurality of elongated slots, the plurality of elongated slots configured to receive a corresponding one of the plurality of heat dissipation fins.

8. A junction box assembly for distributing power, the junction box assembly comprising:
   a lower cover having a floor having an inner surface and an outer surface opposite the inner surface, a peripheral wall is disposed on the inner surface and bounds the floor;
   a holder configured to be removably coupled to the outer surface of the floor of the lower cover, wherein the holder includes a pair of first side walls, a first back wall, and a first top wall connected to each other to define a pocket; and
   a switch, the switch including a hook including a ramp shaped portion and a finger portion, the finger portion spaced apart from a bottom surface of the switch to define a gap configured to accommodate a thickness of the first bottom wall of the holder, the hook configured to engage the lower cover, the switch being dimensioned to be seated within the pocket of the holder, wherein the hook is further configured to pull the switch towards the lower cover so as to pinch the holder against the lower cover.

9. The junction box assembly as set forth in claim 8, further including a first fastener for securing the switch to the holder.

10. The junction box assembly as set forth in claim 8, wherein the switch is a generally cuboidal member, the hook disposed on a bottom surface of the switch.

11. The junction box assembly as set forth in claim 8, further including a plurality of heat dissipation fins disposed on a top surface of the switch.

12. The junction box assembly as set forth in claim 11, wherein the holder includes a plurality of elongated slots configured to receive a corresponding one of the plurality of heat dissipation fins.

13. The junction box assembly as set forth in claim 8, wherein the pocket of the pair of first side walls, the first back wall and the first top wall further define an open front.

14. The junction box assembly as set forth in claim 13, wherein the switch includes a pair of second side walls, a second front wall, a second back wall and a second bottom wall, the pair of second side walls being longer than the pair of first side walls of the holder.

15. The junction box assembly as set forth in claim 14, wherein the hook is disposed on a front portion of the second bottom wall so as to be spaced apart from the open front of the pocket of the holder.

16. The junction box assembly as set forth in claim 14, wherein the lower cover includes a pair of receiving walls disposed on the outer surface, the pair of receiving walls are spaced apart from each other and configured to engage the holder.

17. The junction box assembly as set forth in claim 16, wherein the pair of receiving walls include an engagement feature configured to releasably engage the pair of second side walls.

* * * * *